United States Patent [19]

Imamura

[11] 4,196,763
[45] Apr. 8, 1980

[54] TIRE CORD FABRIC AND TIRE CONSTRUCTION

[75] Inventor: Tosuke Imamura, Itami, Japan

[73] Assignee: Teijin Limited, Osaka, Japan

[21] Appl. No.: 846,072

[22] Filed: Oct. 27, 1977

[30] Foreign Application Priority Data

Nov. 5, 1976 [JP] Japan ................................ 51-132306
Mar. 22, 1977 [JP] Japan ................................ 52-30457
Jun. 1, 1977 [JP] Japan ................................ 52-63191

[51] Int. Cl.² .............................................. B60C 9/00
[52] U.S. Cl. ................................ 152/358; 139/426 R;
152/359; 428/245; 428/255; 428/257; 428/258
[58] Field of Search ............... 428/105, 245, 247, 255,
428/257, 258, 259; 139/420 R, 426 R; 152/358,
356, 357, 359

[56] References Cited

U.S. PATENT DOCUMENTS

| | | |
|---|---|---|
| 3,395,744 | 8/1968 | Wolf et al. ........................... 152/358 |
| 3,534,782 | 10/1970 | Young et al. ..................... 139/426 R |
| 3,695,326 | 10/1972 | Bryant et al. ........................ 152/358 |
| 3,707,178 | 12/1972 | Miller et al. ......................... 152/358 |
| 3,752,206 | 8/1973 | Hough .................................. 152/358 |
| 3,763,913 | 10/1973 | French et al. ........................ 152/358 |
| 3,855,678 | 12/1974 | Schroeder ............................ 152/358 |
| 3,941,162 | 3/1976 | McCabe et al. ................. 139/426 R |
| 4,024,895 | 5/1977 | Barron ................................. 152/358 |

*Primary Examiner*—James J. Bell
*Attorney, Agent, or Firm*—Sughrue, Rothwell, Mion, Zinn and Macpeak

[57] ABSTRACT

A tire cord fabric is provided, the weft of which is composed of thermally modified partially oriented polyester filaments overcoated with adhesive rubbery latex. The weft having a break elongation of at least 80%, a birefringence value of at least 0.03 and dry heat shrinkage of at most 5% at 150° C. for 30 minutes. The fabric shows a superior dimensional stability during crazing process, eliminating undesirable displacement of the weft along the lengthwise of the warp. The wefts in the fabric are also able to expand without breakage during tire building step, enabling the warps to distribute evenly in a spaced relationship.

12 Claims, 5 Drawing Figures

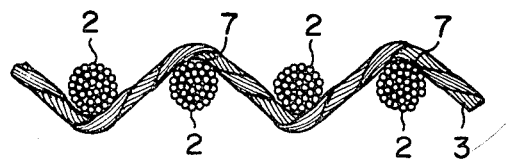
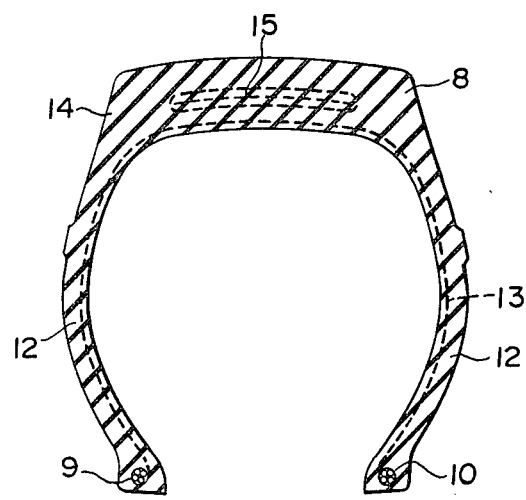
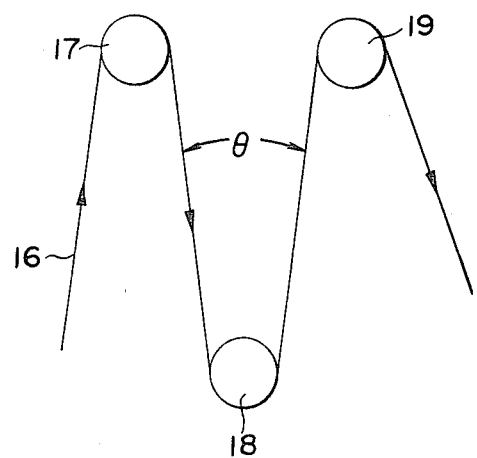

TIRE CORD FABRIC AND TIRE CONSTRUCTION

BACKGROUND OF THE INVENTION

This invention relates to a tire cord fabric for reinforcing a pneumatic tire and to a tire construction. More specifically this invention relates to a tire cord fabric for use in the manufacture of pneumatic tires, which is composed essentially of a high-tenacity polyester filament cords as warp components and comparatively extensible polyester filaments treated with adhesive rubbery latex as weft components. The weft components may also be referred to as pick or filling components.

Heretofore, cotton yarns have been mainly used as the weft yarns in a tire cord fabric. But it has been keenly encountered to those skilled in the art that the cotton yarns raise various problems due to its excessive variance of evenness in strength and also lower extensibility. A typical example of these problems is nonuniformity of a built tire caused by uneven breakage of the weft yarns at the time of expansion of a carcass to a toroidal shape by degree of 40% to 80% during the building and vulcanizing process of the tire.

To overcome these defects, Wolf et al. U.S. Pat. No. 3,395,744, discloses to adopt as a weft yarn in tire cord fabrics synthetic organic filaments of at least partially unoriented state, having a high break elongation of at least 50%. Another proposal is made in Glass et al. U.S. Pat. No. 3,677,318 in which synthetic organic filaments having a high elongation of at least 80% are covered with cotton fibres and these core-spun yarns, when used as weft yarns, show an improved processing ability especially in its even extensibility at the time of tire building process.

It seems that these two proposals render satisfactory results as far as the prevention of breakage of the weft filaments is concerned. But other important problems have been left unsolved. For example, filaments having a high break elongation of at least 50% lies in undrawn state or in transient state from undrawn state to fully drawn state, which means these filaments show an extremely unstable thermal property. Thus a tire cord fabric comprising the above-mentioned filaments has poor dimensional stability even at ambient temperature. Furthermore when the fabric is subjected to a heat treatment, for example, curing process of a resorcinal-formaldehyde-latex applied thereto at a temperature more than 200° C., the weft filaments in the fabric becomes frail, loosing its original extensibility.

Another important point to keep in mind is that a crazing process of a tire cord fabric prior to a tire building is unavoidably necessary in the manufacture of a tire. This crazing aims at obtaining physical softening or flexibility of a tire cord fabric during which process the weft filaments are found to be apt to slide along the warp filaments. This slippage of the weft filaments laterally leads to the uneven placement of the weft filaments in the fabric, which, in turn, results in non-uniform distribution of warp cords during processing of fabric plies and tire construction subsequent to the crazing process and also an unacceptable undulation in the side wall of a completed tire.

Regarding the slippage of the weft filaments, the above-mentioned proposal by the Glass et al. may be useful to prevent the slippage of the weft filaments because the weft filaments used according to the Glass et al. are covered with cotton fibres to increase a frictional coefficient between the weft filaments and the warp cords. Contrary to expectations, this core-spun yarn shows only a little bit or substantially the same effect heretofore obtained with uncovered filaments. A main reason resides in nonuniform covering or wrapping of the cotton fibres about the core filaments and raises a similar problem encountered when cotton yarns are used as weft yarns, e.g., an excessive variance of evenness in strength due to non-uniformity in titer (fineness) of the core-spun yarns. Thus, parallel relationship of warp cords in the fabric, and also uniform distribution of the same in a completed tire are not expected any longer even if the core-spun yarn is employed as the weft yarn in the fabric.

SUMMARY OF THE INVENTION

Accordingly, it is a main object of the invention to provide a tire cord fabric which is thermally stable, resistant to deformation during a crazing process and still expansible conforming to the desired shape without breakage of the weft filaments.

Another object of the invention is to provide a tire cord fabric in which slippage between weft filaments and warp cords is avoided during a crazing process.

A still another object of the invention is to provide a tire construction which is free from undulations in a side wall and still free from a rubber separation due to insufficient adhesion of weft filaments to rubber.

Further object of the invention is to provide a tire construction which obviates not only multiple plies of fabric at carcass portion, but maintains a travelling stability equally to that comprising multiplies of the fabrics at the carcass portion.

The present invention is based on a discovery that when an adhesive rubbery latex is applied to weft filaments with an elongation of at least 80% as well as a dry heat shrinkage of less than 5% at 150° C. for 30 minutes, the treated weft filaments resist to slide along the lengthwise of the warp cords and quite adequate to keep the warp cords in desired spaced relationship.

Thus, according to the invention there is provided a tire cord fabric which comprises warp cords and weft filaments spaced at substantially right angles to said warp cords, said warp cords being composed of high-tenacity filaments and said weft filaments being composed of polyester filaments having a break elongation of 80% to 250%, a birefringence value of 0.03 to 0.13, a dry heat shrinkage of +5% to −5% at 150° C. for 30 minutes and an overcoat composed of adhesive rubbery latex, the amount of which is in the range of 0.3%–3% by weight of said weft filaments.

The warp cords used in the invention may be of any type of synthetic filaments possessing the high tenacity. Typical examples of these are polyester, polyamide, polypropylene, of these polyester especially polyethylene terephthalate is preferably used. These filaments may preferably, have a tenacity of at least 8 grams/denier and a break elongation of 10%–40%, as well known in this field.

The weft filaments used in the invention are specially heat-treated polyester filaments which are obtained by subjecting partially oriented polyester filaments to heat-treatment while tension is applied to them. With regard to the physical properties of the heat-treated polyester filaments, following conditions (a), (b) and (c) must be satisfied with at the same time:

(a) They must have a break elongation of 80% to 250%.

(b) They must have a birifringence value of 0.03 to 0.13.

(c) They must have a dry heat shrinkage of +5% to −5% at 150° C. for 30 minutes.

In addition to the above mentioned basic properties, the latex-overcoating must be provided with the filaments in order to enable them serve as frictionally stable weft yarns.

According to the invention, the condition (a) meets a requirement to eliminate the weft breakage in order to secure an even distribution of the warp cords when the tire cord fabric (carcass) is made to expand to a toroidal shape.

The condition (b) is necessary to prevent the weft filaments from becoming frail during a heat-treatment for diminishing a dry heat shrinkage of the same. Further the condition (c) is absolutely necessary one to secure a dimensional stability of the fabric with regard to a width thereof during dipping and heat-setting process. Nevertheless, there is one point which has not recognized heretofore, i.e., phenomena of deviation or slippage of the weft, caused during crazing process, along the lengthwise of the warp, which results in uneven distribution of the warp end count.

With respect to this defect, the inventor has found a previous overcoating of adhesive rubbery latex overcoating on the weft is extremely successful in order to prevent the deviation of the weft.

This overcoating of latex can be made any time prior to weaving process of the fabric by applying the rubbery latex to the weft filaments.

In case that the weft filaments are overcoated with the rubbery latex having epoxy groups as reactive sites, adhesion of the weft to rubber is also enhanced to result in a tire cord fabric stable to distortional force during travelling between bars (FIG. 5) at crazing process.

As mentioned above, the tire cord fabrics according to the invention retain the original structure as woven up to tire building process in which each of the weft filaments easily expand uniformly to a toroidal shape.

This means that said tire cord fabrics well function as the carcass of a radial tire in the form of mono ply.

Thus, according to another aspect of the invention, there is provided a radical tire construction comprising a tread, two annular beads, and a body portion, said body portion comprising a reinforcing carcass fabric composed of high-tenacity warp cords and, weft filaments of polyester type having a break elongation of 80% to 250%, a birefringence value of 0.03 to 0.13, a dry heat shrinkage of +5 to −5% at 150° C. for 30 minutes and an overcoat comprised of adhesive rubbery latex, the amount of which is in the range of 0.3%–3% by weight of said weft filaments.

DETAILED DESCRIPTION

In the accompanying drawings,

FIG. 3 is a cross-sectional view of the fabric cut along the line A—A' in FIG. 2;

FIG. 4 is a cross-sectional view of a tire of the invention;

FIG. 5 is a schematic representation of crazing process of a tire cord fabric.

Figure 1:
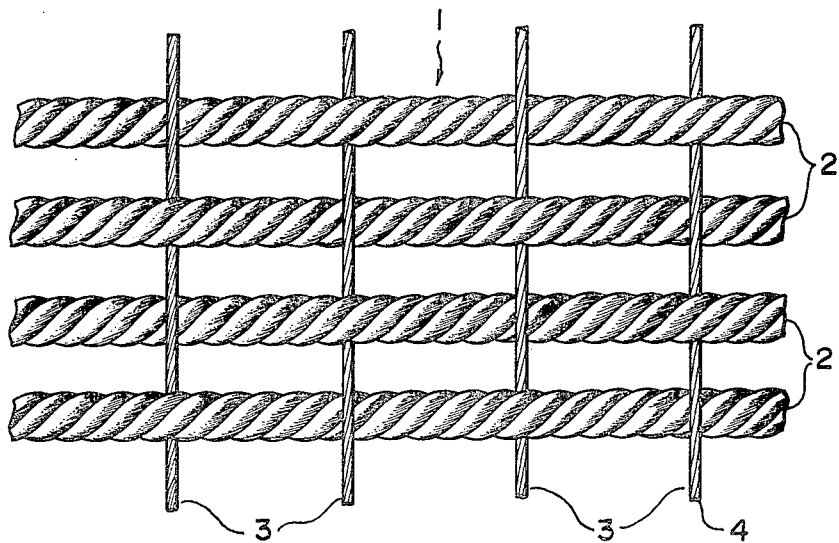
FIG. 1 represents an enlarged view of a portion of a tire cord fabric of the invention.

Referring to FIG. 1, a tire cord fabric 1 contains high-tenacity warp cords 2, and weft filaments 3 with the properties of (a), (b) and (c) hereinbefore described and further an overcoat 4 of rubbery latex. This fabric 1, as shown, is typically a plain weave of warp cords with higher end count and weft filaments with lower pick count.

The weft filaments used in the invention are originally at least partially oriented filaments obtained by melt-spinning polyester into filaments at a take-off (winding) speed of at least 2500 m/minutes from a spinneret to provide the filaments with a break enlongation of at least 80%. There is a defect as to physical property of these filaments when they are woven into a tire cord fabric, using them as weft yarns. Namely, the filaments show an excessive thermal shrinkage of at least 40% at 150° C. dry bulb, which in turn renders poor thermal and dimensional stability of the tire cord fabric with regard to the width thereof. Therefore, the filaments should, prior to weaving them, be subjected to heat-treatment for diminishing a dry heat shrinkage of the filaments while maintaining the break elongation to a level of at least 80%. For the said heat-treatment, it can be carried out by withdrawing the filaments from the wound-up package and advancing them through a water-boiling bath for a few minutes, or through a heated atmosphere maintained to a temperature of 100° C. to 180° C. at dry bulb for a time of less than 60 seconds under relaxed or tensioned state. Another step for the heat-treatment is to leave a cheese or bobbin of the filaments in a heated atmosphere of at least 100° C. in dry or wet state for a time of more than 10 minutes.

The above is a case wherein so-called partially-oriented filaments are heat-treated. In addition, undrawn filaments obtained at a take-off speed of 800 m/minute–1500 m/minute may be subjected to a drawing process which employ a comparatively lower draw ratio ranging from 1.5 to 3.0 times as its original length, to provide drawn filaments having a break elongation of at least 80%.

A heat-treatment for diminishing the dry shrinkage of the drawn filament to a level of at most 5%, preferably 2%, may be carried out concurrently with drawing step, by using a heater plate or slit heater, etc,. Otherwise drawn filaments may be heat-treated in a separate step as mentioned before.

Generally speaking, it is advantageous to employ partially-oriented filaments, especially those prepared at a take-off speed of more than 4000 m/minutes, as they have a superior initial modulus of more than 40 gram/denier which modulus is much desirable as weft in tire cord fabrics.

A limited range of a break elongation defined in the invention is fairly critical to maintain an even distribution of warp cords in the tire shaping. When a break elongation of the weft filaments is less than 80% (or birefringence value exceeds 0.13), the weft filaments resist to elongate itself at a expansion of tire cord fabric, resulting in frequency breakage of the weft. While the above value is more than 250% (or birefringence value is less than 0.03), an unnecessarily excessive elongation occurs on the weft to cause a difficulty of distributing warp cords evenly in a spaced relationship. Further, the filaments do not withstand a thermal treatment in a heat-setting and calendering process to become frail due to crystallization in amosphous state and breakage of the weft occurs frequently during calendering process. This elongation at break is somewhat interrelated with a birefringence value of the same filaments, and filaments having a break elongation of 80% to 250% show a birefingence value ranging from 0.03 to 0.13.

One thing to be noted is that these heat-treated filaments show self-extending property which means minus shrinkage, and at most 5% of extensibility, namely, −5% of shrinkage, is found to be allowable as weft filaments from the view point of dimensional stability of the fabric width after heat-treatment.

Normally, the filaments above-mentioned for use as weft yarns be twisted to a degree of 10 turns/meter to 130 turns/meter, to provide them an improved handling property in the subsequent weaving process. Then, adhesive rubbery latex is applied to said twisted filaments to eliminate slipping of the same in a tire cord fabric, especially at the time of crazing said fabric.

Overcoat of the latex may be formed by any well known step such as dipping of the twisted filaments into latex bath or advancing the twisted filaments in contact with a surface of rotating roller immersed partly in a bath containing latex. Any way these applying systems of latex to the twisted filaments are not critical and latex may be applied to polyester filaments prior to twisting step. The weight of the latex applied to the twisted filaments should be from 0.3% to 3.0% by weight of the filaments. 0.3% by weight is a minimum value to render the weft filaments a desirable property resistant to the slippage, while an upper limit of 3.0% by weight is determined mainly from an economical standpoint, namely, more than 3% by weight does not increase the slippery-resistance of the weft filaments. Adhesive rubbery latices used in the invention are generally well known. For example styrene-butadiene rubber latex, vinyl-pyridine latex, nitril latex or natural rubber latex are cited. In addition to the above, epoxylated latices such as epoxylated polybutadiene, epoxylated styrenebutadiene copolymer, epoxylated nitril butadiene copolymer are preferably adopted as they show a better binding characteristic between weft filaments and rubber in the completed tire.

Figure 2:
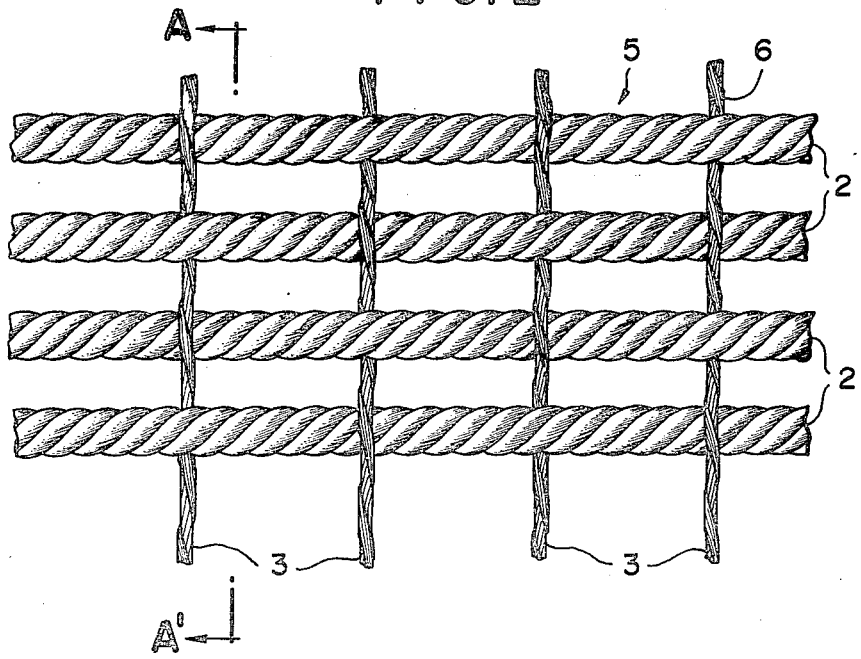
FIG. 2 represents an enlarged view of a portion of another embodiment of a tire cord fabric of the invention.

Referring to FIG. 2, a tire cord fabric 5 is somewhat similar to these shown in FIG. 1, except that the weft filaments are covered with cotton fibres 6 intermittently at regular intervals.

This intermittent covering with cottom fibres is critical to ensure a sufficient adhesion of cross-contacting portion between the weft and the warp, when adhesive such as resorcinal-formaldehyde-latex is applied to the tire cord fabric in a conventional step.

Reason for the sufficient adhesion is that there arises a gap 7 as seen from FIG. 3 into which adhesive penetrates easily to increase contact area for adhesive, and there obtained a firm fixation at the cross-contacting portion between the weft and the warp. To make the gap 7, it is appropriate to maintain a covering ratio in the range of 20%–70%. The covering ratio is a ratio of a covered surface area with cotton fibres to a total surface area of the weft. When the covering ratio is beyond 70%, the gap 7 is not expected to arise, thus adhesive can not penetrate into between the weft and the warp. While the covering ratio becomes less than 20%, the warp will, quite possibly, lie between the adjacent wrapped cotton fibres to cause a direct contact with a surface of the weft, therefore, penetration of adhesive into between the weft and the warp cannot be effected, especially in case that the warp cord of fairly small denier, say, less than 2000 denier, is used.

Fineness of the weft filaments is generally from 75 denier to 125 denier and cotton fibres in the form of spun on silver is recommended to have a fineness of equal denier to or slightly smaller denier than the weft filaments.

As mentioned before, it is quite difficult to cover cotton fibres uniformly about the core, namely, the weft filaments, as the weft filaments if used in unfinished state, are quite slippery. Further, much more difficult is to control covered degree of cotton fibres when they are wrapped about the core of weft intermittently at regular intervals.

These disadvantages can be avoided according to the invention by applying adhesive rubbery latex and at the same time a firm adhesion occurs between a contact position where the weft and the warp cross by either previous application of epoxylated latex to the weft filaments or the intermittent covering of cotton fibre which allows improved degree of penetration of adhesive between said contact portion.

These stable tire cord fabric finds its special use for the carcass in the form of monoply of a radial tire. This is because a need of complete adhesion between rubber and tire cord fabric has been becoming much more severe as the recent development of a monoply carcass in a radial tire.

In FIG. 4, there is shown a radial tire construction containing the tire cord fabric according to the invention. In the FIG., the tire construction comprises a rubber tread member 8, wire beads 9 and 10, side walls 11 and 12, and a carcass member 13 embedded in rubber 14, which member consists essentially of a fabric of the invention in the form of single ply. This tire may also, optionally, may contain tread plies 15 in the form of belts.

Although, the above embodiment discloses that the invention enables adoption of the carcass in the form of single ply, it is not intended to limit the scope of the tire construction of the invention.

From the economical point of view, by use of a carcass in the form of single ply, the tire decrease its weight to result in less consumption of fuel, while maintaining the stability of high speed travelling.

As has been stated, by use of polyester filaments as the wefts in a tire cord fabric, which have the properties of (a), (b) and (c) described before as well as latex overcoating thereupon, a tire cord fabric resistant to blading is provided.

Still, as the weft filaments in the fabric withstand severe heat-treatment during curing (heat-setting) step of adhesive applied to the facric, they allow the warp cords expand evenly in a parallelly spaced relationship when the fabric is shaped to a toroidal form.

The terms indicated hereinafter, especially in Table-II–IX, are defined as follows:

[I] Slippage of the Weft

As shown in FIG. 5, a tire cord fabric 16 is forced to be advanced between three-sets of stainless steel bars 17, 18 and 19 with a diameter of about 10 cm so that the fabric makes a zig-zag path among the bars. Contact angle $\theta$ of the fabric to each of bars is adjusted to about 30°–40°.

When the fabric has passed all of the bars, the weft is observed as to its distance of deviation along the warp. The distance is expressed in mm. and a stable fabric with non slippage of the weft shows at most 1-2 mm deviation.

[II] Weaving Efficiency

This is a standard for weaving speed, namely, shuttle speed which is regulated by Revolution Per Minute (r.p.m.) of a crank shaft in a weaving machine. If the weft is wound stably on a cop, r.p.m. of the crank shaft will increase. Thus Weaving Efficiency is evaluated as follows.

| r.p.m. | Weaving Efficiency |
| --- | --- |
| > 170 | good |
| 150-170 | fair |
| < 150 | poor |

[III] Breakage of the Weft

It is observed after a tire cord fabric is expanded during building process, when all the wefts are retained without breakage this state indicates "non."

[IV] Distribution of the Warp

It is also observed after a tire cord fabric is expanded during building process, all the warps are retained in regularly spaced relationship, this state indicates "even."

[V] Tire Uniformity

This is well known in the art as "Radial Tire Force Variation."

[VI] Undulation

It is observed by inspecting side walls of a built tire in a conventional manner.

EXAMPLE 1

[A] Preparation of polyester filaments for use as the weft

Polyethylene terephthalate chip having an intrinsic viscosity of 0.62 is melted at 290° C., and extruded through a spinneret with 36 orifices of round section, followed by winding up on a bobbin directly at winding speed of 3800 meters/minute. Total denier of the collected filament yarn is 110 de.

This filament yarn is twisted to a degree of 100 turns/meter and wound up on a bobbin to form a cheese. While the filaments are travelling on to the bobbin, vinyl-pyridine latex is applied to them at pickup ratio of 0.5% by weight of the filaments.

The formed cheese, then, is subjected to dry heat-treatment to dimish dry heat shrinkage of the filament at 120° C. for 60 minutes in dry state.

[B] Preparation of tire cord fabric

Using three plies of polyester filament yarn of 1800 denier/250 filament with a tenacity of 8.6/denier as the warp, and the heat-treated filaments in [A] as the weft, a tire cord fabric for use as carcass is woven with 55 ends/5 cm and 2 picks/inch.

This fabric is passed in resorcinol-formaldehyde latex solution wherein the solid component is adhered to it at pick-up ratio of 6% by weight of the fabric, and dried at 150° C. for 4 minutes and then heat-set for curing the adhesive at 240° C. for 2 minutes.

[C] Manufacture of Tire

Using the heat-set fabric in [B] in the form of monoply for the carcass and further steelbelt with construction of 1×5×0.25, 30 ends/5 cm, 2 plies in a tread portion, a radial tire of 165-SR-13 is built.

In Tables I-II below are shown sequential change of the physical property of the weft filaments, slippage of the weft during crazing process, weaving efficiency, breakage of the weft and state of distribution of the warp in the tire and also tire performance.

For comparison, a tire is manufactured in the same manner as shown in the above example, except that heat-treatment of the formed-cheese is omitted. Results of this is also shown as control 1.

Table-I

| Sequential Change of the Physical Properties of the Weft Filaments and the Tire Cord Fabric: | | |
| --- | --- | --- |
|  | The Invention | Control 1 |
| Break Elongation(%) | | |
| Step-1 | 157 | 157 |
| Step-2 | 140 | (157) |
| Step-3 | 125 | 133 |
| Dry Heat Shrinkage(%) 150° C., 30 minutes: | | |
| Step-1 | 50 | 50 |
| Step-2 | 0 | (50) |
| Step-3 | 0 | 0 |
| Birefringence Value: | | |
| Step-1 | 0.040 | 0.040 |
| Step-2 | 0.090 | (0.040) |
| Width of the Fabric (cm: | | |
| Original | 155 | 155 |
| Step-3 | 143 | 126 |

In the above, step-1 stands for "as-spun," step-2 stands for "after heat treated at 120° C., for 60 minutes" in process [A], and step-3 stands for "after heat-set at 240° C. for 2 minutes" in process [B].

Table II

|  | The Invention | Control 1 |
| --- | --- | --- |
| Slippage of the Weft: | 0-1 mm | 0-1 mm |
| Weaving Efficiency: | 170 r.p.m. | 170 r.p.m. |
| Breakage of the Weft: | non | non |
| Distribution of the Warp: | even | uneven, especially in both edges of the fabric |
| Tire Uniformity: (Radial Force Variation) | good | slightly poor |
| Undulation: | non | non |

As seen from the above data, when the heat-treatment for diminishing the as-spun filaments is omitted, it raises serious problems in the expanded fabric as well as the completed tire as to the width of the fabric and distribution of the warp.

Control 2

A tire is manufactured in the same manner as shown in Example 1 except that both the heat-treatment of the formed cheese and also application of vinyl pyridine latex in process [A] are omitted. Results are shown in Table-III below.

Table-III

|  | The Invention | Control 2 |
| --- | --- | --- |
| Slippage of the Weft (mm): | 0–1 mm | 5–40 mm (irregular weft line) |
| Weaving Efficiency (r.p.m.): | 170 r.p.m. | difficult to weave, only hand-weaving possible and cop destruction occurs. |
| Breakage of the Weft: | non | non |
| Distribution of the Warp: | even | uneven |
| Tire Uniformity: | good | poor |
| Undulation: | non | non |

EXAMPLE 2

In Example 1, the conditions of heat-treatment for diminishing the dry heat shrinkage of the as-spun filaments are changed in order to obtain the heat-treated weft filaments with various shrinkage and break elongation.

In Table-IV, Processing abilities of the weft filaments in connection with its thermal shrinkage, are shown, from which it is clearly seen that the fabric according to the invention retains more than 90% of the original length, even after curing process of adhesive applied to the fabric.

Table-IV

| Run No. | 2 | 3 | 4 |
| --- | --- | --- | --- |
| Heat-Treatment: | 1000° C. 7 minutes | 100° C. 5 minutes | — |
| Break Elongation (%): | 145 | 150 | 157 |
| Dry Heat Shrinkage (%) at 150° C., 30 minutes | 0.5 | 5 | 50 |
| Slippage of the Weft (mm): | 0–1 | 0–1 | 0–1 |
| Weaving Efficiency (r.p.m.): | 170 | 170 | 170 |
| Width of the Fabric (cm): Original After | 155 | 155 | 155 |
| heat-set | 152 | 142 | 132 |
| Distribution of the Warp: | even | even | even |
| Tire Uniformity: | good | good | slightly poor |
| Undulation: | non | non | non |

EXAMPLE 3

In example 1, pick-up of vinyl pyridine latex to be applied to the twisted weft filaments is changed. Relation between the pick-up and the processing ability of the weft is as follows. It will be seen from the Table V that in case pick up is less than 0.3% by weight, the weft filaments are apt to slide along the direction of the warp to result in undesirable distribution of the warp after the fabric is expanded.

Table-V

| Run No. | 5 | 6 | 7 | 8 | 9 | 10 |
| --- | --- | --- | --- | --- | --- | --- |
| Pick-up (% by weight) | 0.2 | 0.8 | 1.5 | 2 | 3 | 4 |
| Slippage of the Weft: | 3–10 | 0–1 | 0–1 | 0–1 | 0–1 | 0–1 |
| Weaving Efficiency (r.p.m.) | 150 | 170 | 170 | 170 | 170 | 170 |
| Breakage of the Weft: | non | non | non | non | non | non |
| Distribution of the Warp: | uneven | even | even | even | even | even |
| Tire Uniformity: | poor | good | good | good | good | good |
| Undulation: | non | non | non | non | non | non |

EXAMPLE 4

A tire is manufactured in the same manner as in Example 1, except employing the following conditions:

| | |
| --- | --- |
| Number of twist in Process [A] | 120 turns/meter |
| Latex applied to the twisted filaments in Process [A] | Epoxylated rubbery latex emulsified with ethylene oxide adduct (20 moles) of castor-oil. |
| Emulsion Pick-up | 3% by weight of the filaments |
| Solid Pick-up | 1.5% by weight of the filaments |

Results obtained during fabrication to tire manufacture are shown below.

Table-VI

| Run No. | 11 | 12 | 13 |
| --- | --- | --- | --- |
| Latex | E.B. | E.S.B. | E.N.B. |
| Slippage of the Weft (mm): | 0–1 | 0–1 | 0–1 |
| Weaving Efficiency (r.p.m.): | 170 | 170 | 170 |
| Breakage of the Weft: | non | non | non |
| Distribution of the Warp: | even | even | even |
| Adhesion of the Weft to rubber: | Rubber Break | Rubber Break | Rubber Break |
| Tire Uniformity: | good | good | good |
| Undulation: | non | non | non |

In the Table "E.B." is epoxylated polybutadiene, "E.S.B." is epoxylated styrene-butadiene copolymer and "E.N.B." is epoxylated nitril-butadiene copolymer.

As can be seen from the above table, epoxylated latex renders superior results with respect to "adhesion of the weft to rubber" which enables more than 170 km/hr high-speed endurance. This is because the epoxylated latex applied to the weft participates in a cross linking reaction which occurs during the curing process of resorcinol-formaldehyde-latex applied to the fabric.

EXAMPLE 5

In process [A] of Example 1, the spun filaments are withdrawn from the bobbin and twisted to a degree of 120 turns/meter, and before the filaments are taken up on a cheese expoxylated polybutadiene emulsion containing, as a emulsifier, ethylene oxide adduct (30 moles) of castor-oil is applied to the filaments at pick-up ratio of 1% by weight wherein solid pick up is 0.5% by weight. The formed cheese, then, is subjected to heat-treatment to diminish thermal shrinkage of the filaments and also torque of the same at 120° C. (dry heat) for 30 minutes.

The heat-set filaments are processed with a so called core-spun system using a conventional cotton ring-spinning technology.

In this case cotton sliver of 44 counts in cotton system is applied to the core of the heat-set filaments by twisting the former around the latter in various covering ratio.

Then a tire cord fabric and a tire is manufactured in the same manner as shown in process [B] and [C] of Example 1, except that following weaving conditions are employed.

| Warp: | two plies of 1000 de/250 filaments |
|---|---|
| End Count: | 100/5 cm |
| Pick Count: | 2/inch |
| Carcass: | two plies |

Results are shown in Table-VII, from which it can be seen that the tire shows extremely superior stability with regard to adhesion between rubber and the fabric when the covering range is from 20% to 70%.

Table-VII

| Run No. | 14 | 15 | 16 | 17 | 18 | 19 |
|---|---|---|---|---|---|---|
| Covering Ratio (%) | 15 | 20 | 40 | 70 | 75 | 85 |
| Slippage of the Weft (mm) | 0–1 | 0–1 | 0–1 | 0–1 | 0–1 | 0–1 |
| Weaving Efficiency (r.p.m.) | 170 | 170 | 170 | 170 | 170 | 170 |
| Penetration of latex into between the warp and the weft | poor* | fair | good | fair | poor | poor |
| Breakage of the Weft: | non | non | non | non | non | non |
| Distribution of the Warp: | even | even | even | even | even | even |
| Tire Uniformity: | good | good | good | good | good | good |
| Undulation: | non | non | non | non | non | non |

"Poor" means that the crossing portion of the warp and the weft is throughly white i.e., it retain original filament color, due to non-penetration of latex. On the other hand, "fair" or "good" means that the crossing portion is colored by latex due to good penetration of latex.

As can be seen from the above, covering ratio lying out of a range of the invention prevents the formation of a gap between the weft and the warp, thus leaving non-treated crossing portions with latex.

Control 3

A tire is manufactured in the same manner as in Example 5 except that the twisted filaments with 120 turns/meter wound in the form of a cheese are directly subjected to a heat-treatment without application of epoxylated polybutadiene emulsion thereupon.

In Table-VIII, are shown the results during the fabrication and the tire manufacture.

Table-VIII

| Run No.: | 20 | 21 | 22 | 23 | 24 | 25 |
|---|---|---|---|---|---|---|
| Covering Ratio(%): | 15 | 20 | 40 | 70 | 80 | 100 |
| Covering Efficiency: | bad | bad | bad | bad | slightly bad | fair |
| Cop-Up Efficiency: | bad | bad | bad | bad | fair | fair |
| Weaving Efficiency: | 140 | 140 | 140 | 150 | 170 | 170 |

"Bad" in covering efficiency means that cotton fibres cannot be covered stably around the core. Also "Bad" in cop-up efficiency means that slub like mass of the weft is formed on the cop so that even withdrawal of the weft can not be expected during weaving.

In this example other performances such as slippage of the weft breakage of the weft, distribution of the weft etc, show same level among Run No. 20–25.

EXAMPLE 6

In process [A] of Example 1, the spun filaments are withdrawn from the bobbin and twisted to a degree of 120 turns/meter, and before the filaments are taken up on a cheese polybutadiene emulsion containing, as an emulsifier, ethylene oxide adduct (30 moles) of castor-oil is applied to the filaments at pick-up ratio of 1% by weight wherein solid pick up is 0.5% by weight. The formed cheese, then, is subjected to heat-treatment to diminish thermal shrinkage of the filaments and also torque of the same at 120° C. (dry bulb) for 30 minutes.

The heat-set filament is processed with a so called core-spun system using a conventional cotton ring-spinning technology.

In this case cotton sliver of 44 counts in cotton system is applied to the core of the heat-set filaments by twisting the former around the latter in various covering ratio.

Then a tire cord fabric and a tire is manufactured in the same manner as shown in process [B] and [C] of Example 1.

Results are shown in Table-IX, from which it can be seen that the tire shows extremely improved stability with regard to adhesion between rubber and the fabric when the covering range is from 20% to 70%.

Table-IX

| Run No.: | 26 | 27 | 28 | 29 | 30 | 31 |
|---|---|---|---|---|---|---|
| Covering Ratio (%): | 15 | 20 | 40 | 70 | 75 | 85 |
| Slippage of the Weft (mm): | 0–1 | 0–1 | 0–1 | 0–1 | 0–1 | 0–1 |
| Weaving Efficiency (r.p.m.): | 140 | 170 | 170 | 170 | 150 | 140 |
| Breakage of the Weft: | non | non | non | non | non | non |
| Distribution of the Warp: | even | even | even | even | even | even |
| Tire Uniformity: | fairly good | good | good | good | good | good |
| Undulation: | non | non | non | non | non | non |

Control 4

A tire is manufactured in the same manner as in Example 6 except that the twisted filaments wound in the form cheese is directly subjected to a heat-treatment without application of the latex.

In this case, stable covering operation can not be effected when cotton fibres are applied around the heat-treated weft filaments.

What is claimed is:

1. A tire cord fabric which comprises warp cords and weft filaments spaced at substantially right angles to said warp cords, said warp cords being composed essentially of high-tenacity filaments and said weft filaments being composed essentially of polyester filaments composed of ethylene terephthalate repeating units and having a break elongation of 80% to 250%, a birefringence value of 0.03 to 0.13, a dry heat shrinkage of +5% to −5% at 150° C. for 30 minutes and an overcoat only on said weft filaments comprised of adhesive rubbery latex, the amount of which is in the range of 0.3% to 3% by weight of said weft filaments.

2. The tire cord fabric according to claim 1, in which the warp filaments of the warp cords are polyethylene terephthalate.

3. The tire cord fabric according to claim 1, in which the warp cords have a tenacity of at least 8 gr/de and a break elongation of 10% to 40%.

4. The tire cord fabric according to claim 1, in which the weft filaments are composed of polyethylene terephthalate and twisted to 10 to 130 turns/meter.

5. The tire cord fabric according to claim 1, in which the weft filaments are partially oriented polyethylene terephthalate filaments.

6. The tire cord fabric according to claim 1, in which the weft filaments have a break elongation of 100% to 200% and a dry heat shrinkage of +2% to −2% at 150° C. for 30 minutes.

7. The tire cord fabric according to claim 1, in which the adhesive rubbery latex is epoxylated composition selected from the group consisting of epoxylated polybutadiene, epoxylated styrene-butadiene copolymer and epoxylated nitril-butadiene copolymer.

8. The tire cord fabric according to claim 1 in which the weft filaments overcoated with the adhesive rubbery latex are further covered with cotton fibres at a covering ratio of 20% to 70% hereinafter defined.

9. The tire cord fabric according to claim 8, in which the cotton fibres are employed in the form of cotton sliver.

10. The tire cord fabric according to claim 8, in which the cotton fibres are employed in the form of a spun yarn made therefrom.

11. A tire comprising a rubber tread, two annular beads, and a carcass member, said carcass member being composed essentially of high-tenacity warp cords and weft filaments of polyester type composed of ethylene terephthalate repeating units having a break elongation of 80% to 250% and a dry heat shrinkage of +5% to −5% at 150° C. for 30 minutes; said weft filaments only having an overcoat comprised of adhesive rubbery latex, the amount of which is in the range of 0.3% to 3% by weight of said weft filaments.

12. The tire according to claim 11 in which the carcass member is embedded therein in the form of monoply.

* * * * *